United States Patent
Bando et al.

(10) Patent No.: US 12,028,415 B2
(45) Date of Patent: Jul. 2, 2024

(54) CONTROL APPARATUS AND CONTROL METHOD

(71) Applicant: Mitsubishi Electric Corporation, Tokyo (JP)

(72) Inventors: Shun Bando, Tokyo (JP); Tomoaki Takagi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/918,905

(22) PCT Filed: Aug. 26, 2020

(86) PCT No.: PCT/JP2020/032097
§ 371 (c)(1),
(2) Date: Oct. 14, 2022

(87) PCT Pub. No.: WO2022/044143
PCT Pub. Date: Mar. 3, 2022

(65) Prior Publication Data
US 2023/0239353 A1    Jul. 27, 2023

(51) Int. Cl.
*H04L 67/12* (2022.01)
*G06F 13/12* (2006.01)

(52) U.S. Cl.
CPC ............ *H04L 67/12* (2013.01); *G06F 13/122* (2013.01)

(58) Field of Classification Search
CPC ................................ H04L 67/12; G06F 13/122
See application file for complete search history.

(56) References Cited

U.S. PATENT DOCUMENTS 9,927,788 B2 * 3/2018 Balentine ............. G05B 19/409
2017/0156076 A1 * 6/2017 Eom ...................... H04W 24/10

FOREIGN PATENT DOCUMENTS

| JP | 2000-235412 A | 8/2000 |
| JP | 2003-18240 A | 1/2003 |
| JP | 2007-80286 A | 3/2007 |
| JP | 2007-233593 A | 9/2007 |

OTHER PUBLICATIONS

C. K. Yep, S. H. Boey and J. Goh, "Information flow modeling of a flexible cell controller," Proceedings of IECON '93—19th Annual Conference of IEEE Industrial Electronics, Maui, HI, USA, 1993, pp. 575-580 vol. 1, doi: 10.1109/IECON.1993.339013. (Year: 1993).*
International Search Report and Written Opinion mailed on Dec. 1, 2020, received for PCT Application PCT/JP2020/032097, filed on Aug. 26, 2020, 8 pages including English Translation.

* cited by examiner

*Primary Examiner* — Eric T Oberly
(74) *Attorney, Agent, or Firm* — XSENSUS LLP

(57) ABSTRACT

A type identification unit identifies a request type included in input information input from the outside of a control apparatus; and a state storage unit stores state information when the request type identified by the type identification unit is a preset request, the state information including device information and the input information associated with each other, the device information including device data stored in a storage area specified in specification information, the input information being input to the control apparatus.

11 Claims, 9 Drawing Sheets

FIG.5

| TRANSMISSION SOURCE INFORMATION | TYPE INFORMATION | PARAMETER INFORMATION |
|---|---|---|
| AA | write | D100 (100) |

FIG.6

| TYPE | SPECIFICATION MEMORY ADDRESS | | |
|---|---|---|---|
| write | D10 | D20 | D100 |

FIG.7

| DEVICE INFORMATION | | |
|---|---|---|
| D10 (1) | D20 (10) | D100 (100) |

FIG.8

STATE INFORMATION X

| TRANSMISSION SOURCE INFORMATION | TYPE INFORMATION | PARAMETER INFORMATION | DEVICE INFORMATION | | |
|---|---|---|---|---|---|
| AA | write | D100 (100) | D10 (1) | D20 (10) | D100 (100) |

STATE INFORMATION Y

| TRANSMISSION SOURCE INFORMATION | TYPE INFORMATION | PARAMETER INFORMATION | DEVICE INFORMATION | | |
|---|---|---|---|---|---|
| AA | write | D100 (500) | D10 (2) | D20 (10) | D100 (500) |

STATE INFORMATION Z

| TRANSMISSION SOURCE INFORMATION | TYPE INFORMATION | PARAMETER INFORMATION | DEVICE INFORMATION | | |
|---|---|---|---|---|---|
| BB | write | D100 (200) | D10 (1) | D20 (10) | D100 (200) |

FIG.9

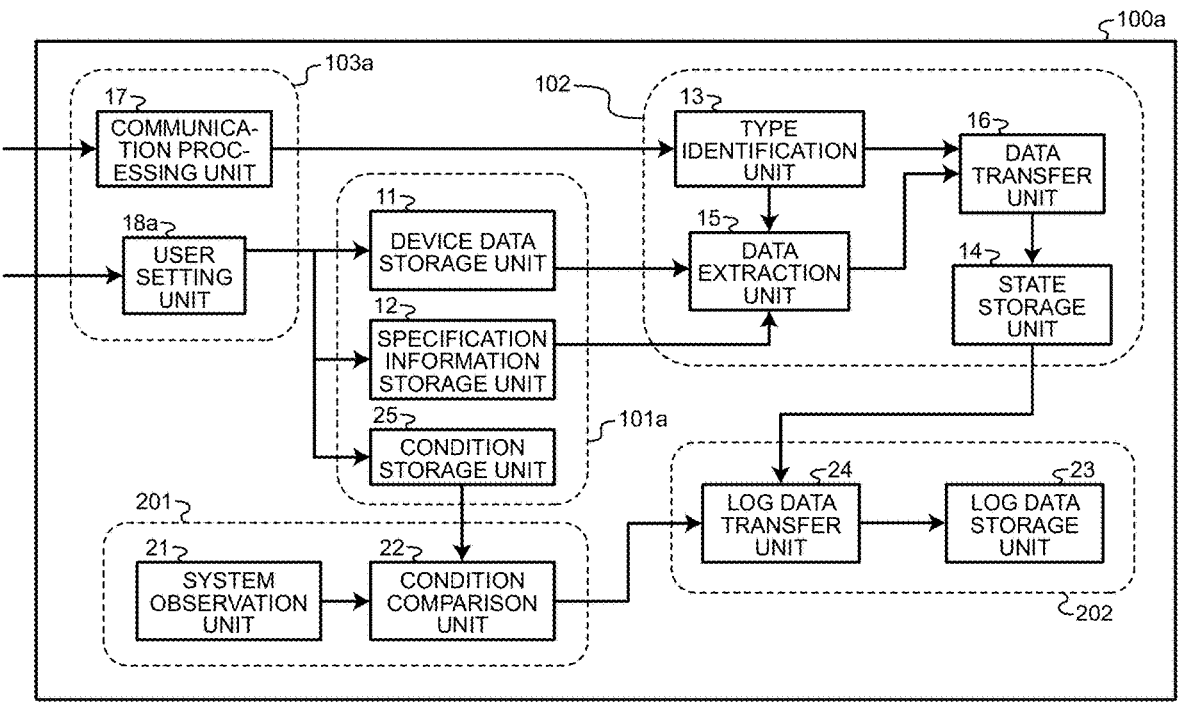

FIG.14

| FEASIBILITY FLAG | ○ |
|---|---|

| TRIGGERING CONDITION | FLAG UPDATE INFORMATION |
|---|---|
| CONDITION 1 | ✗ |
| CONDITION 2 | ○ |

CONTROL APPARATUS AND CONTROL METHOD

CROSS-REFERENCE TO RELATED APPLICATION

The present application is based on PCT filing PCT/JP2020/032097, filed Aug. 26, 2020, the entire contents of which are incorporated herein by reference.

FIELD

The present disclosure relates to a control apparatus and a control method that facilitate analysis of a factor that has affected a control state of the control apparatus.

BACKGROUND

In recent years, the field of factory automation (FA) has employed a control system using a control apparatus for controlling devices, etc. of a manufacturing line. For example, such a control system is configured to have control apparatuses such as programmable logic controllers (PLCs). These control apparatuses are connected to one another and to a host computer such as a personal computer (PC). The control apparatus receives input of various data and execute a program such as a user program, such that the control system controls the operation of devices etc. connected to the control apparatus.

In such a control system, a control apparatus needs to correctly process various types of input information input from the outside and control the operation of devices, etc. connected to the control apparatus. It is therefore necessary to check the control state of the control apparatus in the control system so that when there is an anomaly in the control state of the control apparatus, the anomaly occurring in the control state is removed to allow the normal operation of the control apparatus. In addition, it is known that to check the control state of the control apparatus, the control system collects control information that is a result of processing performed by the control apparatus.

To collect control information, conventionally, it has been proposed to use a data collection device that collects control information which is information on a processing result stored in a control apparatus (see, for example, Patent Literature 1).

The data collection device disclosed in Patent Literature 1 collects data, which is control information, from the control apparatus connected thereto via network communication. To this end, the data collection device prevents data collection time, etc. from being delayed due to the state of network communication.

CITATION LIST

Patent Literature

Patent Literature 1: Japanese Patent Application Laid-open No. 2007-080286

SUMMARY

Technical Problem

However, even if control information is collected by the above-described data collection device, there is a problem of failing to easily analyze a factor that has affected the control state of the control apparatus. That is, as a result of collecting the above-described data, i.e., control information, it is possible to check, from details of such collected data, data indicating the control state, but not possible to identify a factor that has affected the data indicating the control information. This is because the data indicating the control information is a result obtained from various types of information input to the control apparatus from the outside and processed by the control apparatus. In order to identify a factor that has affected the control state of the control apparatus, it is necessary to analyze input information on the basis of which the control apparatus has executed control. Unfortunately, it is very difficult to reproduce, from the processing result, i.e., the control information, the details and input states of various types of information input to the control apparatus from the outside. For this reason, it is not possible to easily analyze a factor that has affected the control state of the control apparatus.

The present disclosure has been made to solve the above-described problem, and an object of the present disclosure is to provide a control apparatus and a control method that facilitate analysis of a factor that has affected a control state of the control apparatus.

Solution to Problem

The present disclosure provides a control apparatus for controlling a device to be controlled, using input information input from an outside, the apparatus comprising: a device data storage unit to store, in storage areas, device data to be used for the control; a type identification unit to identify a request type representing a type of request included in the input information; a specification information storage unit to store specification information that specifies any of the storage areas; and a state storage unit to store state information when the request type identified by the type identification unit is a preset request, the state information including device information and the input information in association with each other, the device information including the device data stored in the storage area specified in the specification information.

Advantageous Effects of Invention

A control apparatus of the present disclosure includes a type identification unit that identifies a request type representing a request included in input information input from the outside of the control apparatus. When the request type identified by the type identification unit is a preset request, device information and the input information are associated with each other and stored as state information in a state storage unit, the device information including device data stored in a storage area specified in specification information, the input information being input to the control apparatus. As a result, it is possible to store necessary device information in accordance with the request type of input information and to store the input information corresponding to the device information. It is therefore easy to analyze a factor that has affected the control state of the control apparatus.

BRIEF DESCRIPTION OF DRAWINGS

FIG. 5 is a diagram schematically illustrating an example of a configuration of input information according to the first embodiment.

FIG. 6 is a diagram schematically illustrating an example of a configuration of specification information according to the first embodiment.

FIG. 7 is a diagram illustrating an example of device information created based on the specification information according to the first embodiment.

FIG. 8 is a diagram illustrating examples of state information according to the first embodiment.

FIG. 9 is a diagram illustrating an example of a configuration relating to information collection processing in a control apparatus according to a second embodiment by using functional blocks.

FIG. 14 is a diagram schematically illustrating examples of a feasibility flag, triggering conditions, and flag update information to be stored in a condition storage unit according to the third embodiment.

DESCRIPTION OF EMBODIMENTS

Hereinafter, control apparatuses according to embodiments of the present disclosure will be described with reference to the drawings.

First Embodiment

Figure 1:
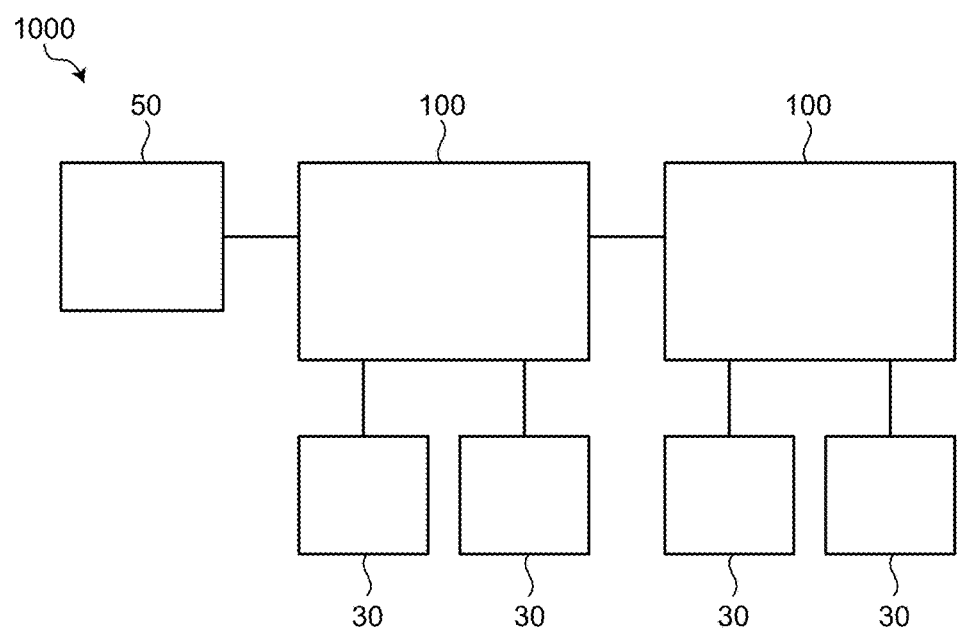
FIG. 1 is a diagram illustrating an example of a configuration of a control system according to a first embodiment.

FIG. 1 illustrates an example of a configuration of a control system 1000 including a control apparatus 100 according to a first embodiment of the present disclosure. The control system 1000 is a system constructed in a factory so as to operate a manufacturing line. The control system 1000 includes devices 30, the control apparatuses 100, and a terminal 50. The devices 30 define the manufacturing line. The control apparatuses 100 control the devices 30 by executing user programs. The terminal 50 is capable of setting details of control to be performed by the control apparatus 100 and displaying the details of control to be performed by the control apparatus 100.

FIG. 1 illustrates an example of the control system 1000 having two control apparatuses 100 connected to each other such that these two apparatuses can communicate with each other. One of the two control apparatuses 100 is connected to the terminal 50 such that that one apparatus can communicate therewith. FIG. 1 illustrates each control apparatus 100 as being connected to the two devices 30 such that each apparatus 100 can communicate with these two devices 30. Note that the number of the control apparatuses 100 in the control system 1000 is not limited to two, and the control system 1000 may include a single control apparatus 100 or three or more control apparatuses 100. In addition, the number of the devices 30 to be connected to a single control apparatus 100 is not limited to two, and may be one, or three or more. Furthermore, the same applies to the number of the terminals 50.

The control apparatuses 100 are connected to one another in a wired or wireless manner via a dedicated line or a network such that the apparatuses can communicate with one another. The same is true of the connection between the control apparatus 100 and the terminal 50, and the connection between the control apparatuses 100 and the devices 30. In the case of the connection using the dedicated line, the dedicated line is, for example, a universal serial bus (USB) cable. In the case of the connection via the network, the network is, for example, an open network such as the Internet, or a closed network such as a local area network (LAN).

The terminal 50 is a personal computer (PC) that is, typically, an industrial personal computer (IPC), a tablet terminal, or another user interface (UI) terminal. The terminal 50 provides a screen to be used by a user for setting a user program, acquires a user program input by a user operation, converts the user program into an executable form, and then inputs the user program to the control apparatus 100. The terminal 50 creates various parameters to be used when the user program is executed, and inputs the various parameters to the control apparatus 100. In addition, the terminal 50 reads and displays various types of information stored in the control apparatus 100.

The control apparatus 100 is, for example, a programmable logic controller (PLC) that implements a series of manufacturing lines by collectively controlling the devices 30 to cause the devices 30 to operate in conjunction with each other. The control apparatus 100 receives a user program from the terminal 50, and performs control processing defined by the user program to control the device 30. In addition, the control apparatus 100 executes firmware stored in the control apparatus 100 to perform information collection processing.

Examples of the device 30 include a sensor, an actuator, a robot, an inspection device, and other FA devices to be installed in a manufacturing line. The device 30 operates according to a result of executing the user program in the control apparatus 100. In a case where the device 30 is a sensor, for example, sensing is performed with a period specified by the user program, and a sensing result is input to the control apparatus 100. In addition, when the device 30 is an inspection device, quality inspection of a workpiece is performed according to a quality determination criterion specified by the user program, and an inspection result is input to the control apparatus. The device 30 is an example of a device to be controlled by the control apparatus 100.

Figure 2:
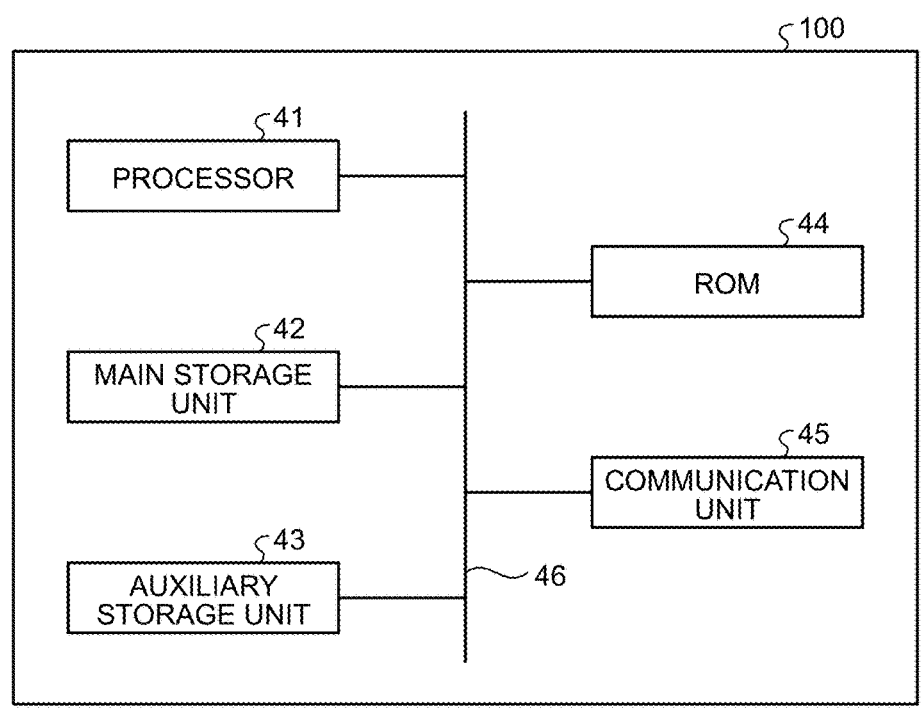
FIG. 2 is a diagram schematically illustrating an example of a hardware configuration of a control apparatus according to the first embodiment.

FIG. 2 schematically illustrates an example of a hardware configuration of the control apparatus 100 according to the present embodiment, that is, the first embodiment. As illustrated in FIG. 2, the control apparatus 100 includes a processor 41, a main storage unit 42, an auxiliary storage unit 43, a read only memory (ROM) 44, and a communication unit 45. The main storage unit 42, the auxiliary storage unit 43, the ROM 44, and the communication unit 45 are all connected to the processor 41 via an internal bus 46.

The processor 41 includes a central processing unit (CPU) or a micro processing unit (MPU). The processor 41 implements various functions of the control apparatus 100 to perform each processing to be described below by executing user programs stored in the auxiliary storage unit 43 and firmware stored in the ROM 44. Note that the user program is a program described in, for example, a ladder language, and is a program for causing the control apparatus 100 to control the device 30. Furthermore, the firmware is a program described in, for example, any desired programming language such as C language and used for executing the functions of the control apparatus 100.

The main storage unit 42 includes a random access memory (RAM). A user program is read into the main storage unit 42 from the auxiliary storage unit 43, and firmware is read into the main storage unit 42 from the ROM 44. Then, the main storage unit 42 is used as a work area for the processor 41.

The auxiliary storage unit 43 and the ROM 44 each include a nonvolatile memory typified by an electrically erasable programmable read-only memory (EEPROM), a hard disk drive (HDD), a memory card, and the like. The auxiliary storage unit 43 stores various data to be used for processing to be performed by the processor 41, in addition to user programs. The auxiliary storage unit 43 and the ROM 44 supply the processor 41 with data to be used by the processor 41, in accordance with an instruction from the processor 41. In addition, the auxiliary storage unit 43 stores data supplied from the processor 41.

Each of the main storage unit 42, the auxiliary storage unit 43, and the ROM 44 has storage areas for storing various data. In addition, a memory address for specifying each storage area is assigned to the storage area.

The communication unit 45 includes a communication interface circuit for communicating with an external device. The communication unit 45 receives a signal from the outside, and outputs data indicated by the signal to the processor 41. Furthermore, the communication unit 45 transmits, to an external device, a signal indicating data output from the processor 41. Note that although a single communication unit 45 is representatively illustrated in FIG. 2, the configuration of the present embodiment is not limited thereto. For example, a communication unit 45 for communicating with the terminal 50 and a communication unit 45 for communicating with the device 30 may be separately provided and included in the control apparatus 100.

The control apparatus 100 exhibits various functions by cooperation of the above-described hardware configuration.

The control apparatus 100 according to the first embodiment receives input information from the outside of the control apparatus such as a terminal capable of communicating with the control apparatus 100, another control apparatus 100, and the device 30, and performs control processing of controlling the device 30, using the input information. Note that controlling the device 30, using the input information includes, means, for example, that the control apparatus 100 determines a user program to be used for the control, using at least part of information included in the input information and performs control processing, and that the control apparatus 100 writes and reads device data to be used for the control of the device 30, using at least part of information included in the input information and performs control processing. In addition, the control apparatus 100 performs information collection processing, using input information input from the outside.

Figure 3:
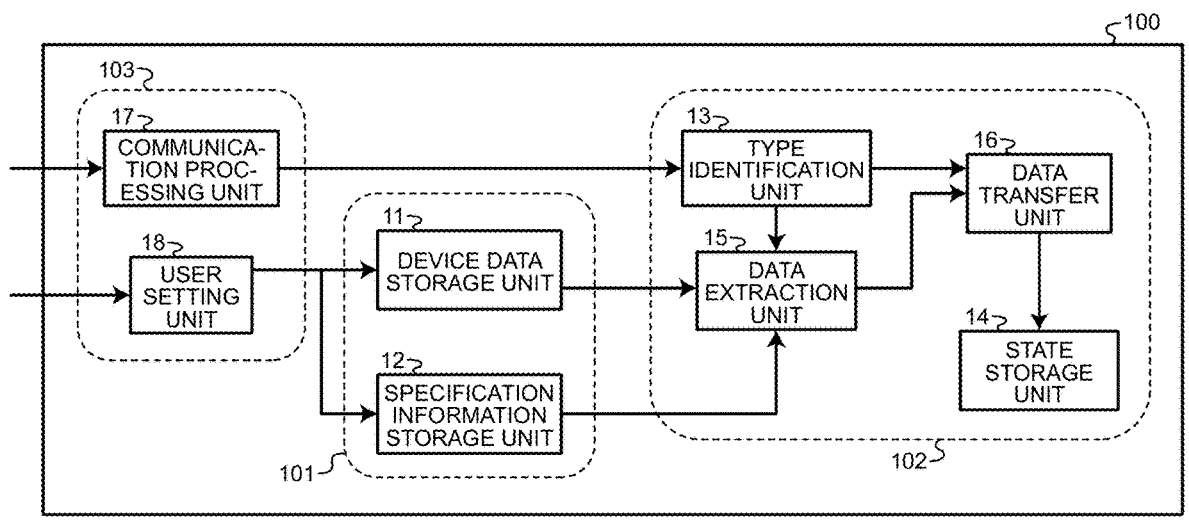
FIG. 3 is a diagram illustrating an example of a configuration relating to information collection processing in the control apparatus according to the first embodiment by using functional blocks.

FIG. 3 illustrates an example of a configuration relating to information collection processing in the control apparatus 100 according to the first embodiment by using functional blocks. As illustrated in FIG. 3, the control apparatus 100 according to the present embodiment, that is, the first embodiment includes a storage unit 101 and a data collection unit 102. The storage unit 101 includes a device data storage unit 11 and a specification information storage unit 12. The device data storage unit 11 stores, in storage areas, device data to be used for controlling the device 30. The specification information storage unit 12 stores specification information specifying any of the storage areas. The data collection unit 102 includes a type identification unit 13 and a state storage unit 14. The type identification unit 13 identifies a request type representing a type of request included in input information input from the outside. The state storage unit 14 stores state information based on the request type identified by the type identification unit 13. In addition, the control apparatus 100 includes an external interface (I/F) unit 103 including a communication processing unit 17 and a user setting unit 18. Input information is input to the communication processing unit 17. Specification information is input to the user setting unit 18.

The device data storage unit 11 is a part of the storage unit 101 in the control apparatus 100. The device data storage unit 11 is defined by an area of at least a part of the main storage unit 42 and/or the auxiliary storage unit 43, and stores device data in storage areas of the device data storage unit 11. The device data stored in the device data storage unit 11 is data to be used when the control apparatus 100 executes a user program. When input information is input to the control apparatus 100, the device data is, for example, written and read according to the input information.

The specification information storage unit 12 is a part of the storage unit 101 in the control apparatus 100. The specification information storage unit 12 is defined by an area of at least a part of the main storage unit 42 and/or the auxiliary storage unit 43, and stores specification information. The specification information includes information specifying any of the storage areas included in the device data storage unit 11. More specifically, the specification information is information that associates, with a specified storage area, a request type corresponding to a request type representing the type of request included in input information. That is, the specification information also includes a request type that is a preset request for storing state information in the state storage unit 14, as will be described below. For example, when the request type is a write request, the specification information is information that associates information indicating the write request with one or more memory addresses specifying storage areas such as a memory address specifying a storage area into which device data are written as a result of processing input information, and a memory address specifying a storage area that stores device data specifying a user program corresponding to a manufacturing process to be executed. Note that a storage area to be specified in the specification information can be freely specified by the user, and it is desirable to specify a storage area that stores device data that may affect the control state of the control apparatus 100. In addition, a storage area may be specified using a memory address that specifies the storage area, or may be specified by another method.

The type identification unit 13 is a part of the data collection unit 102 in the control apparatus 100, and is implemented by the processor 41. The type identification unit 13 extracts type information indicating the type of request included in input information having been input, and identifies a request type.

The state storage unit 14 is a part of the data collection unit 102 in the control apparatus 100, and is defined by an area of at least a part of the main storage unit 42 and/or the auxiliary storage unit 43. When the request type identified by the above-described type identification unit 13 is a preset request, the state storage unit 14 stores state information. In the state information, device information including device data stored in a storage area specified in specification information is associated with input information input to the control apparatus 100. The state storage unit 14 may store state information in any format provided that the state storage unit 14 can store the state information, but it is desirable to employ a ring buffer format so as to more efficiently control the device 30 in the control apparatus 100. This is because if the ring buffer format is employed, the state storage unit 14 can store state information, voluntarily returning to the head of a storage area of the state storage unit 14 even after reaching the end of the storage area, so that it is not necessary to stop the control apparatus 100 and delete state information.

The data collection unit 102 includes a data extraction unit 15 and a data transfer unit 16 in addition to the type identification unit 13 and the state storage unit 14. The data extraction unit 15 and the data transfer unit 16 are implemented by the processor 41.

The data extraction unit 15 creates device information that will be included in the state information that will be stored in the above-described state storage unit 14. Specifically, the data extraction unit 15 acquires information indicating a request type identified by the type identification unit 13, and extracts specification information from the specification information storage unit 12 on the basis of the request type identified by the type identification unit 13. That is, the data extraction unit 15 acquires information indicating a request type identified by the type identification unit 13, and extracts, from the specification information storage unit 12, specification information including information indicating a request type matching the request type identified by the type identification unit 13. Using information indicating a storage area specified and included in the extracted specification information, the data extraction unit 15 extracts, from the device data storage unit 11, device data stored in the specified storage area. Then, the data extraction unit 15 creates device information that associates a memory address specifying the storage area specified in the specification information, with the device data stored in the storage area specified in the specification information.

The data transfer unit 16 transfers, to the state storage unit 14, the input information having the request type identified by the above-described type identification unit 13, and the device information created by the above-described data extraction unit 15. The transferred input information and device information are stored as state information in the state storage unit 14. That is, the state storage unit 14 stores state information including device data stored in a storage area specified in specification information, a memory address specifying the storage area which stores that device data, and input information having a request type identified by the type identification unit 13.

Each of the communication processing unit 17 and the user setting unit 18 is a part of the external I/F unit 103 in the control apparatus 100, and includes the communication unit 45. The communication processing unit 17 outputs input information input from the outside of the control apparatus 100, to a control unit (not illustrated) that controls the device 30, and to the type identification unit 13 described above. The user setting unit 18 outputs, to the specification information storage unit 12 described above, specification information set by the user and input to the control apparatus 100.

Figure 4:
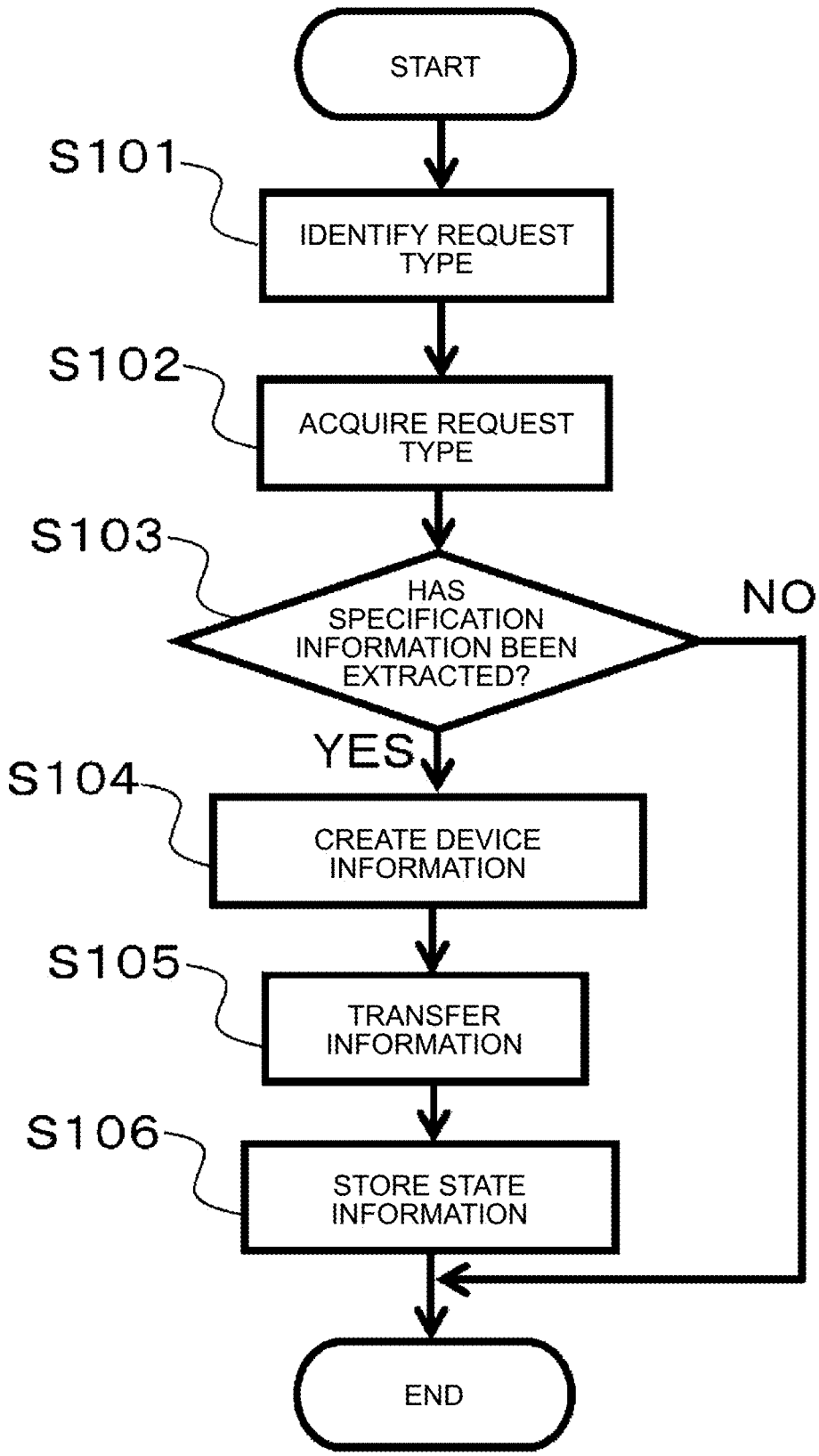
FIG. 4 is a flowchart illustrating the information collection processing to be performed by the control apparatus according to the first embodiment.

Operation related to information collection processing to be performed by the control apparatus 100 according to the first embodiment and a control method related to the information collection processing will be described below with reference to FIG. 4. FIG. 4 is an example of a flowchart illustrating the operation related to the information collection processing to be performed by the control apparatus 100 and the control method related to the information collection processing. Note that the information collection processing can be performed in parallel with control processing for controlling the device 30.

The user inputs specification information to the control apparatus 100 before the control apparatus 100 performs information collection processing. The specification information is stored in advance in the specification information storage unit 12 via the user setting unit 18. The control apparatus 100 may be configured to perform the information collection processing together with execution of the control processing, or may be configured to have a start button, etc. for performing the information collection processing so that the information collection processing can be performed at any timing that the user desires. Note that the above-described step of storing specification information in advance in the specification information storage unit 12 via the user setting unit 18 corresponds to an example of a specification information storage step.

The control apparatus 100 implements operation related to the information collection processing, executing a control method set forth in steps S101 to S106 below.

As illustrated in FIG. 4, the control apparatus 100 allows input information input from the outside to be output to the type identification unit 13. The type identification unit 13 that has acquired the input information extracts a request type from the input information, and identifies the request type (step S101). The type identification unit 13 outputs, to the data extraction unit 15, information indicating the identified request type. The data extraction unit 15 acquires the information indicating the request type (step S102). The data extraction unit 15 extracts and acquires, from the specification information storage unit 12, specification information including information indicating a request type matching the acquired information indicating the request type (step S103). The data extraction unit 15 extracts, from the device data storage unit 11, device data stored in a storage area specified in the acquired specification information, and creates device information (step S104). The data transfer unit 16 acquires the input information from the type identification unit 13, and acquires the device information from the data extraction unit 15. Then, the data transfer unit 16 transfers the acquired information to the state storage unit 14 (step S105). The state storage unit 14 stores state information, i.e., the input information and the device information transferred from the data transfer unit 16 in association with each other (step S106). Each step will be described below.

In step S101, the type identification unit 13 identifies a request type indicating the type of request included in input information. FIG. 5 schematically illustrates an example of a configuration of input information. As illustrated in FIG. 5, the input information includes transmission source information such as an internet protocol (IP) address indicating a transmission source, and type information indicating a request type such as a write request or a read request directed to the control apparatus 100. Furthermore, the input information includes parameter information including device data and a memory address. Examples of the device data include a device value and a label indicating a device name, to be used by the control apparatus 100 for performing control. The memory address is for specifying a storage area to which the request is targeted. That is, the input information includes various types of information to be used by the control apparatus 100 for performing control. When input information is information transmitted from the terminal 50, the input information includes the IP address of the terminal 50 as transmission source information. Meanwhile, when the input information is information transmitted from another control apparatus 100, the input information includes the IP address of the other control apparatus 100 as transmission source information. In addition, when input information is information transmitted from the device 30, transmission source information includes the IP address of the device 30 as transmission source information.

Note that, FIG. 5 illustrates an example of the configuration of the input information, in which transmission source information is represented as "AA", type information is represented as "write" that refers to a write request, parameter information is indicated by "D100" that is a memory address for specifying a storage area and "(100)" that refers to device data. That is, the input information illustrated in FIG. 5 indicates that when this input information is input to the control apparatus 100, a process of writing the device data "100" into a storage area specified by the memory address "D100" among the storage areas of the device data storage unit 11 is performed. When acquiring input information, therefore, the type identification unit 13 extracts type information included in the input information, and identifies a request type. Then, the type identification unit 13 outputs, to the data extraction unit 15, the extracted type information that is the information indicating the request type. In addition, the type identification unit 13 outputs, to the data transfer unit 16, the input information having the request type identified. Step S101 corresponds to an example of a type identification step.

In step S102, the data extraction unit 15 acquires the information indicating the request type, in other words, acquires the type information output from the type identification unit 13. In step S103, the data extraction unit 15 extracts and acquires, from the specification information storage unit 12, specification information including information indicating a request type matching the acquired type information (step S103: YES). Note that when no specification information including information indicating a request type matching the acquired information indicating the request type is stored in the specification information storage unit 12 (step S103: NO), the control apparatus 100 ends the information collection processing.

FIG. 6 schematically illustrates an example of a configuration of specification information stored in the specification information storage unit 12. As illustrated in FIG. 6, specification information stores information "write" and information on three memory addresses "D10", "D20", and "D100" in association with each other. The information "write" indicates a write request as information indicating a request type. Those three memory addresses, which are specification memory addresses, are memory addresses for specifying storage areas specified in association with the request type. Such specified three specification memory addresses are memory addresses specified by the user, such as a memory address of a destination to which device data is written as a result of the processing of input information, and a memory address that stores device data for specifying a user program corresponding to a manufacturing process to be performed. That is, the specification information illustrated in FIG. 6 indicates that when the request type is "write", the memory addresses "D10", "D20", and "D100" specify storage areas which the data extraction unit 15 reads in extracting device data. In step S103, on the basis of the type information acquired from the type identification unit 13, the data extraction unit 15 extracts and acquires, from specification information stored in the specification information storage unit 12, specification information including information indicating a request type matching the type information.

In step S104, the data extraction unit 15 reads a specification memory address specifying a storage area specified in the specification information acquired in step S103, extracts, from the device data storage unit 11, device data stored in the storage area specified in the specification memory address, and creates device information, associating the specification memory address with the device data stored in the specification memory address. FIG. 7 schematically illustrates an example of a configuration of device information. FIG. 7 illustrates device information created on the basis of the specification information illustrated in FIG. 6. For the device information of FIG. 7, pieces of device data stored in the storage areas specified by the memory addresses "D10", "D20", and "D100" in the device data storage unit 11 are "1", "10", and "100", respectively. The data extraction unit 15 outputs the created device information to the data transfer unit 16.

In step S105, the data transfer unit 16 transfers, to the state storage unit 14, the input information acquired from the type identification unit 13 and the device information acquired from the data extraction unit 15. Then, in step S106, the state storage unit 14 stores, as state information, the input information and the device information transferred from the data transfer unit 16 in association with each other. That is, in the first embodiment, the state storage unit 14 stores state information including device information created on the basis of specification information including information indicating a request type matching a request type included in input information. The state storage unit 14 stores the state information when a request type identified by the type identification unit 13 is a request set in advance in the specification information. Step S106 corresponds to an example of a state storage step.

As described above, every time input information is input from the outside, the control apparatus 100 performs steps S101 to S106 described above, and stores state information. FIG. 8 schematically illustrates examples of the configuration of state information stored in the state storage unit 14.

FIG. 8 illustrates three pieces of state information stored in the state storage unit 14 as a result of inputting input information to the control apparatus 100 three times. In FIG. 8, the three pieces of state information are represented as state information X, Y, and Z for convenience. The state information X has input information and device information stored in association with each other. The input information of the state information X includes the transmission source information "AA", the type information "write", and parameter information including the memory address "D100" specifying a storage area and the device data "100". The device information of the state information X includes the specification memory addresses "D10", "D20", and "D100", and the device data "1", "10", and "100" stored in storage areas specified by the specification memory addresses "D10", "D20", and "D100", respectively. The state information Y has input information and device information stored in association with each other. The input information of the state information Y includes the transmission source information "AA", the type information "write", and parameter information including the memory address "D100" specifying a storage area and device data "500". The device information of the state information Y includes the specification memory addresses "D10", "D20", and "D100", and the device data "2", "10", and "500" stored in the storage areas specified by the specification memory addresses "D10", "D20", and "D100", respectively. Furthermore, the state information Z has input information and device information stored in association with each other. The input information of the state information Z includes transmission source information "BB" which is different from the transmission source information in the state information X and Y, the type information "write", and parameter information including the memory address "D100" specifying a storage area and device data "200". The device information of the state information Z includes the specification memory addresses "D10", "D20", and "D100", and the device data "1", "10", and "200" stored in the storage areas specified by the specification memory addresses "D10", "D20", and "D100", respectively.

As illustrated in FIG. 8, the control apparatus 100 stores, as state information, the input information and the device information in association with each other. It is therefore easy to analyze a factor that has affected the control state of the control apparatus 100. A description will be made as to a control state of the control apparatus 100, by way of example, assuming that the control state considered correct provides the device data "10" and "100" stored in the storage areas specified by the memory addresses "D20" and "D100", respectively, when device data stored in the storage area specified by the memory address "D10" is "1".

In the above-described case, the state storage unit 14 stores the state information Z indicating that the device data "1", "10", and "200" is stored in the storage areas specified by the memory addresses "D10", "D20", and "D100", respectively, in device information. As a result, the user can recognize that there is an anomaly in the control state of the control apparatus 100 by analyzing the state information, as the device data stored in the storage area specified by the memory address "D100" is "200". Then, the state storage unit 14 stores input information included in the state information Z, indicating that the transmission source "BB" made a request to write the device data "200" to the storage area specified by the memory address "D100". As a result, analysis of the state information enables the user to recognize that a factor in storing "200" as device data in the storage area specified by the memory address "D100" is based on input information transmitted from the transmission source BB. By thus storing state information, the control apparatus 100 can therefore easily analyze a factor that has affected the control state of the control apparatus 100.

As described above, in the control apparatus 100 and the control method according to the first embodiment, the type identification unit 13 identifies a request type indicating the type of request included in input information input from the outside of the control apparatus 100, and the state storage unit 14 stores state information in which device information and the input information input to the control apparatus are associated with each other. The device information includes a specification memory address specifying a storage area specified in specification information on the basis of the request type identified by the type identification unit 13, and device data stored in the storage area specified by the specification memory address. That is, when the request type identified by the type identification unit 13 is a preset request, the state storage unit 14 stores state information in which device information including device data stored in the storage area specified in the specification information and the input information are associated with each other. As a result, it is possible to store necessary device information in accordance with the request type of input information and to store the input information corresponding to the device information. It is therefore possible to easily analyze a factor that has affected the control state of the control apparatus 100.

Second Embodiment

A control apparatus 100a and a control method according to a second embodiment of the present disclosure will be described with reference to the drawings. Note that the same constituent elements as those in the first embodiment described above are denoted by the same reference numerals, and a specific description thereof will be omitted. A configuration different from that of the first embodiment will be hereinafter specifically described.

The control apparatus 100a according to the present embodiment, that is, the second embodiment is implemented by the same hardware configuration as that of the first embodiment described above. The control apparatus 100a according to the second embodiment also performs control processing and information collection processing by using input information as described above. FIG. 9 illustrates an example of a configuration relating to information collection processing in the control apparatus 100a according to the second embodiment by using functional blocks.

As illustrated in FIG. 9, the control apparatus 100a according to the second embodiment includes a trigger determination unit 201 and a log data storing unit 202. The trigger determination unit 201 includes a system observation unit 21 and a condition comparison unit 22. The system observation unit 21 provides observation information indicating the control state of the control apparatus 100a. The condition comparison unit 22 compares the observation information with a triggering condition specified by a user. The log data storing unit 202 includes a log data storage unit 23 that stores, as log data, state information stored in the state storage unit 14 when the observation information satisfies the triggering condition. In addition, the control apparatus 100a includes the data collection unit 102 that is the same as that in the first embodiment described above, and a storage unit 101a and an external I/F unit 103a that are different from those in the first embodiment described above.

The system observation unit 21, which is a part of the trigger determination unit 201 in the control apparatus 100a, is implemented by the processor 41. The system observation unit 21 provides observation information indicating the control state of the control apparatus 100a. The observation information is information obtained from the control state when the control apparatus 100a performs control processing. Examples of the observation information include information indicating that device data stored in a predetermined memory address has changed, information indicating that an anomaly has occurred in an operation in control processing, and information indicating the number of times a user program is executed in control processing.

More specifically, the control apparatus 100a executes the user program, using device data to thereby perform control processing, such that the control apparatus 100a updates device data in order to reflect a result of the control processing in the device data every time the user program is executed. At the time of thus updating the device data, the device data is changed on the basis of the result of control processing. By setting, as an observation target, a predetermined memory address that stores device data, the system observation unit 21 can observe whether the device data stored in the observation-target memory address has been changed. When the device data has been changed, the system observation unit 21 can output, as observation information, information indicating this change in the device data stored in the predetermined memory address.

In addition, when the control apparatus 100*a* executes the user program, using device data to thereby perform control processing, an operation in the control processing may stop if there is an anomaly in the read device data. In such a case, the control apparatus 100*a* notifies an arithmetic error, and stops the control processing. By setting such an arithmetic error notification as an observation target, the system observation unit 21 can output, as observation information, information indicating that an anomaly has occurred in the operation in the control processing.

Furthermore, when the control apparatus 100*a* executes the user program, using device data to thereby perform control processing, the number of times the user program is executed is counted by a counter. In such a case, by setting a count made by the counter as an observation target, the system observation unit 21 can output, as observation information, information indicating the number of times the user program is executed in control processing. Note that the system observation unit 21 can be set in such a way as to output observation information on the basis of any desired information that can be acquired from the control apparatus 100*a*.

The condition comparison unit 22, which is a part of the trigger determination unit 201 in the control apparatus 100*a*, is implemented by the processor 41. The condition comparison unit 22 compares observation information with a triggering condition specified by a user operation. The triggering condition is information serving as a condition for acquiring state information stored in the state storage unit 14 set forth in the first embodiment described above and storing the state information as log data in the log data storage unit 23 to be described below. The triggering condition is specified in advance by a user operation. The triggering condition is information set in such a way as to correspond to the above-described observation information. Examples of the triggering condition are where device data stored in a predetermined memory address is changed, where an anomaly occurs in an operation in control processing, and where the user program is executed a predetermined number of times or more in control processing. Note that when observation information satisfies a triggering condition, the condition comparison unit 22 provides notification that the observation information satisfies the triggering condition. Furthermore, in addition to the notification, the condition comparison unit 22 outputs the observation information compared with the triggering condition and satisfying the triggering condition. When outputting the observation information, the condition comparison unit 22 may output a label indicating the observation information instead of outputting the observation information itself.

The log data storage unit 23, which is a part of the log data storing unit 202 in the control apparatus 100*a*, is defined by an area of at least a part of the main storage unit 42 and/or the auxiliary storage unit 43. When the comparison made by the above-described condition comparison unit 22 reveals that observation information provided from the system observation unit 21 satisfies a triggering condition, the log data storage unit 23 acquires state information stored in the state storage unit 14 of the data collection unit 102, and stores the state information as log data. Note that log data is information including the state information, and may further include other information. For example, observation information output from the condition comparison unit 22 and state information may be stored in association with each other.

The log data storing unit 202 includes a log data transfer unit 24 in addition to the log data storage unit 23. The log data transfer unit 24 is implemented by the processor 41. The log data transfer unit 24 acquires notification that the comparison made by the condition comparison unit 22 described above reveals that the observation information has satisfied the triggering condition. When acquiring the notification, the log data transfer unit 24 acquires state information stored in the state storage unit 14. Then, the log data transfer unit 24 outputs the acquired state information to the log data storage unit 23. Note that when acquiring the notification that the observation information has satisfied the triggering condition, the log data transfer unit 24 may acquire the observation information compared with the triggering condition together with the notification. In such a case, the log data transfer unit 24 outputs the acquired observation information and state information to the log data storage unit 23.

The storage unit 101*a* includes a condition storage unit 25 in addition to the device data storage unit 11 and the specification information storage unit 12 set forth in the first embodiment described above. The condition storage unit 25 is defined by an area of at least a part of the main storage unit 42 and/or the auxiliary storage unit 43. The condition storage unit 25 stores a triggering condition to be compared with observation information in the condition comparison unit 22. The condition storage unit 25 can store one or more triggering conditions.

The external I/F unit 103*a* includes the communication processing unit 17 set forth in the first embodiment described above, and a user setting unit 18*a*. The user setting unit 18*a* includes the communication unit 45. The user setting unit 18*a* has the function of outputting a triggering condition specified by a user operation, to the condition storage unit 25 in addition to the function of outputting specification information similar to that in the first embodiment to the specification information storage unit 12.

Figure 10:
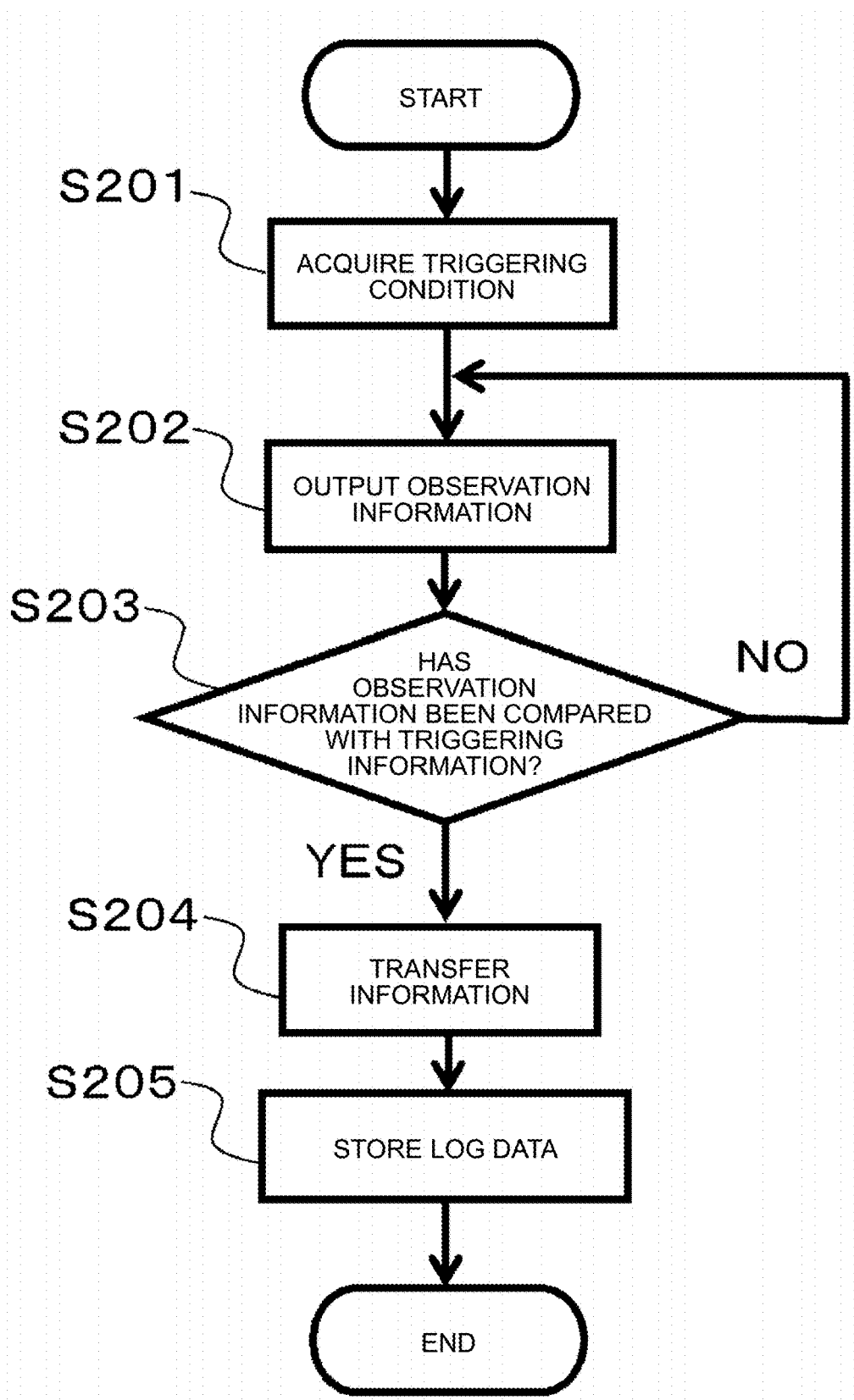
FIG. 10 is a flowchart illustrating the information collection processing to be performed by the control apparatus according to the second embodiment.

Operation and a control method related to information collection processing to be performed by the control apparatus 100*a* according to the present embodiment, that is, the second embodiment will be described below with reference to FIG. 10. FIG. 10 is an example of a flowchart illustrating the operation and the control method related to information collection processing to be performed by the control apparatus 100*a*. Note that, also in the second embodiment, information collection processing can be performed in parallel with control processing for controlling the device 30, as in the first embodiment described above.

The user inputs specification information and a triggering condition to the control apparatus 100*a* before information collection processing is performed in the control apparatus 100*a*. The specification information and the triggering condition are set by being stored in advance in the specification information storage unit 12 and the condition storage unit 25 via the user setting unit 18*a*.

When information collection processing starts, the control apparatus 100*a* performs steps S101 to S106 described in the first embodiment. In addition, the control apparatus 100*a* implements operation related to the information collection processing by executing a control method to be set forth in steps S201 to S205 below.

The information collection processing set forth in steps S101 to S106 in FIG. 4 described above and the information collection processing set forth in steps S201 to S205 in FIG. 10 may be performed in parallel. Alternatively, steps S201 to S205 may be performed after steps S101 to S106 are performed. Note that, in FIG. 10, since steps S101 to S106 are identical to those in the first embodiment described above, illustration thereof is omitted, and steps S201 to S205 are illustrated and described.

As illustrated in FIG. 10, when the control apparatus 100a starts information collection processing, the condition comparison unit 22 acquires a triggering condition stored in the condition storage unit 25 (step S201). Then, the system observation unit 21 observes the control state of the control apparatus 100a, and outputs observation information to the condition comparison unit 22. (step S202). When acquiring the observation information, the condition comparison unit 22 compares the observation information with the triggering condition (step S203). When a result of comparing the observation information with the triggering condition indicates that the observation information satisfies the triggering condition, the condition comparison unit 22 notifies the log data transfer unit 24 that the observation information satisfies the triggering condition. Upon receiving the notification, the log data transfer unit 24 acquires state information from the state storage unit 14, and transfers the acquired state information to the log data storage unit 23 (step S204). The log data storage unit 23 stores, as log data, the state information acquired from the log data transfer unit 24 (step S205). Each step will be described below.

In step S201, the condition comparison unit 22 acquires a triggering condition from the condition storage unit 25. In the second embodiment, a description will be given on the assumption that the condition comparison unit 22 acquires a triggering condition that an anomaly occurs in an operation in control processing.

In step S202, the system observation unit 21 observes the control state of the control apparatus 100a, and outputs observation information to the condition comparison unit 22. That is, the system observation unit 21 observes the control state of the control apparatus 100a, namely, observes a processing result of control processing performed by the control apparatus 100a, and outputs observation information. In the second embodiment, a description will be given assuming that the system observation unit 21 sets arithmetic error notification as an observation target and outputs observation information indicating that an anomaly has occurred in an operation in control processing. Note that step S202 corresponds to an example of a system observation step.

In step S203, the condition comparison unit 22 compares the observation information acquired from the system observation unit 21 with the triggering condition acquired from the condition storage unit 25. When the observation information satisfies the triggering condition (YES in step S203), the condition comparison unit 22 notifies the log data transfer unit 24 that the observation information satisfies the triggering condition. In addition to the notification, the condition comparison unit 22 outputs the observation information compared with the triggering condition and satisfying the triggering condition. When the observation information does not satisfy the triggering condition (No in step S203), the condition comparison unit 22 returns to step S202, and repeats the processing. As described above, in the second embodiment, the condition comparison unit 22 acquires a triggering condition that an anomaly occurs in an operation in control processing from the condition storage unit 25, and acquires observation information indicating that an anomaly has occurred in an operation in control processing from the system observation unit 21. As a result, the condition comparison unit 22 not only notifies the log data transfer unit 24 that the observation information satisfies the triggering condition, but also outputs the observation information satisfying the triggering condition. Note that step S203 corresponds to an example of a condition comparison step.

In step S204, upon receiving the notification from the condition comparison unit 22, the log data transfer unit 24 acquires, from the state storage unit 14, all the state information stored in the state storage unit 14 at the time of receiving the notification. Then, the log data transfer unit 24 transfers, to the log data storage unit 23, the state information acquired from the state storage unit 14 and the observation information acquired from the condition comparison unit 22.

In step S205, the log data storage unit 23 stores log data. That is, the log data storage unit 23 stores the state information and the observation information transferred from the log data transfer unit 24, in association with each other. Note that step S205 corresponds to an example of a log data storage step.

Figure 11:
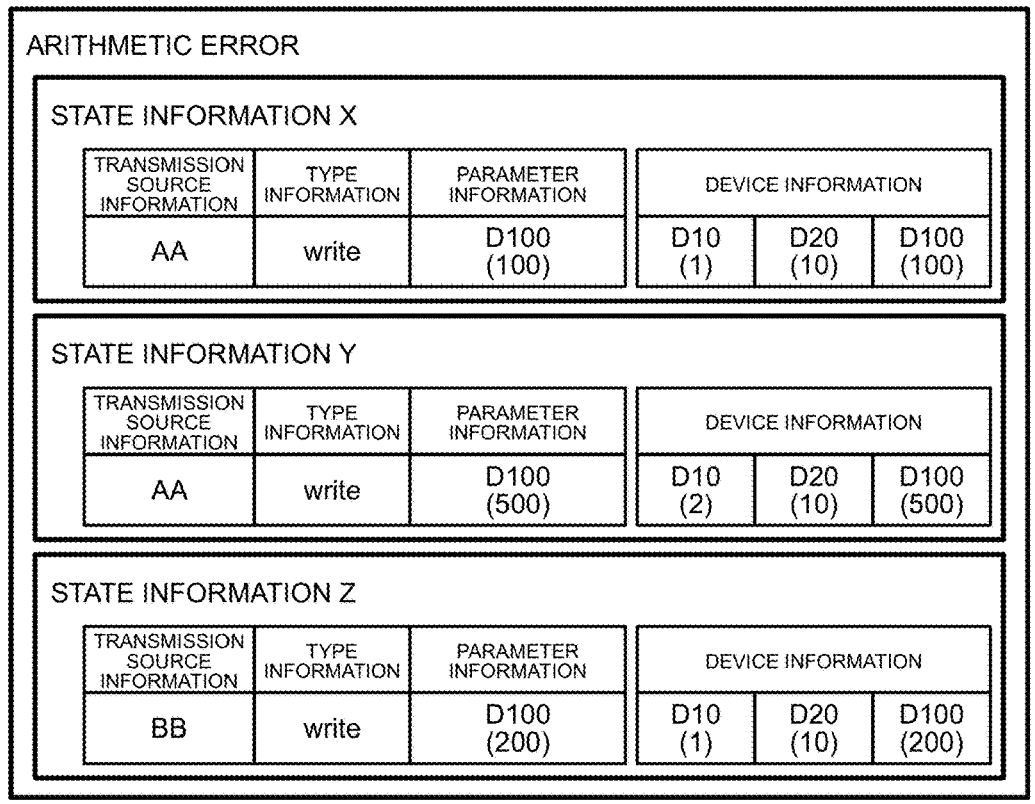
FIG. 11 is a diagram illustrating an example of a configuration of log data according to the second embodiment.

FIG. 11 illustrates an example of a configuration of log data stored in the log data storage unit 23. As illustrated in FIG. 11, the state information illustrated in FIG. 8 and a label "arithmetic error" indicating observation information are stored as log data in association with each other. As in the first embodiment, by storing state information, the control apparatus 100a can therefore easily analyze a factor that has affected the control state of the control apparatus 100a. Furthermore, since state information is stored as log data by use of a triggering condition set in advance by a user operation, it is possible to easily analyze a factor that has affected the control state of the control apparatus 100a at any desired timing in the control state of the control apparatus 100a set by the user as the triggering condition. In addition, since observation information satisfying a triggering condition and state information are stored as log data in association with each other, it is possible to identify the state information stored as log data, as being state information stored when an arithmetic error occurred in control processing performed by the control apparatus 100a.

As described above, in the control apparatus 100a and the control method according to the second embodiment, state information is collected in the data collection unit 102, and it is thus possible to easily analyze a factor that has affected the control state of the control apparatus 100a as in the first embodiment. In addition, when observation information indicating the control state of the control apparatus 100a satisfies a triggering condition set in advance by a user operation, state information stored in the state storage unit 14 is stored as log data in the log data storage unit 23. As a result, it is possible to store log data, i.e., state information having device information and input information associated with each other, at any timing specified by the user. It is therefore possible to easily analyze a factor that has affected the control state of the control apparatus 100a, at any desired timing in the control state of the control apparatus 100a specified as a triggering condition by the user.

Furthermore, since the log data storage unit 23 stores log data, i.e., observation information satisfying a triggering condition and state information in association with each other, it is possible to identify the state information stored as log data, as being state information stored at any timing specified by the user in control processing performed by the control apparatus 100a.

Third Embodiment

A control apparatus 100b and a control method according to a third embodiment of the present disclosure will be described with reference to the drawings. Note that the same constituent elements as those in the first and second embodiments described above are denoted by the same reference numerals, and a specific description thereof will be omitted. A configuration different from the configurations in the first and second embodiments will be hereinafter specifically described.

Figure 12:
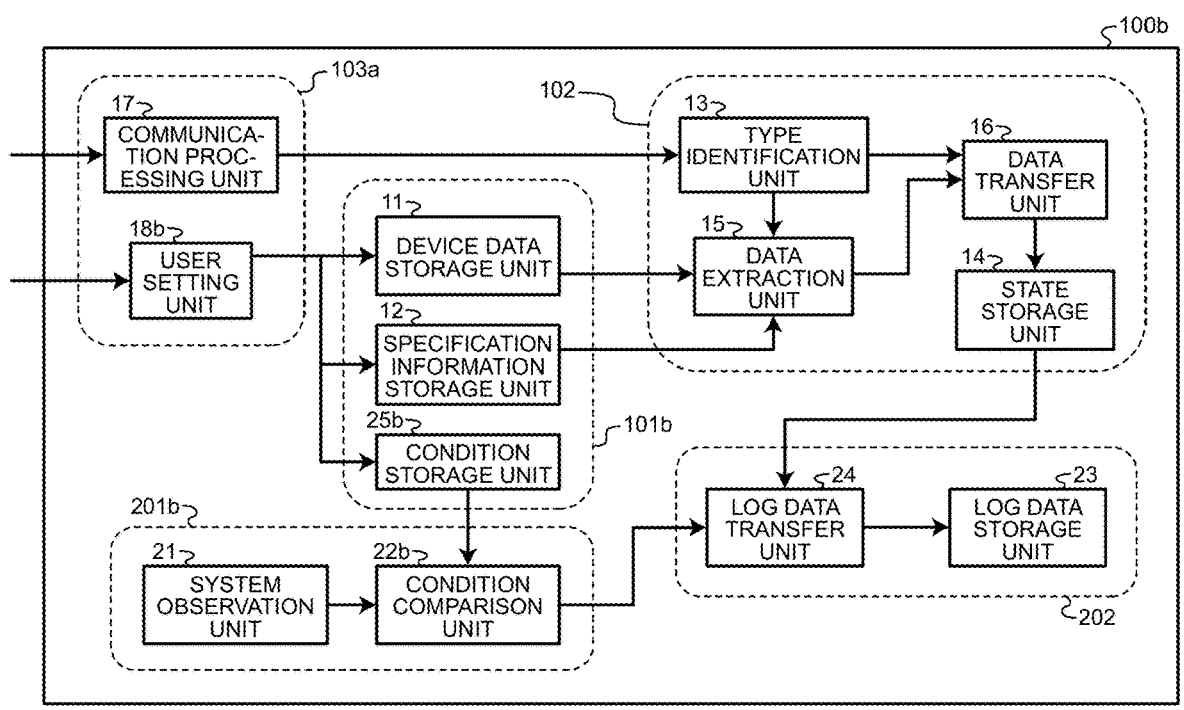
FIG. 12 is a diagram illustrating an example of a configuration relating to information collection processing in a control apparatus according to a third embodiment by using functional blocks.

The control apparatus 100b according to the present embodiment, that is, the third embodiment is implemented by the same hardware configuration as that of the first embodiment described above. The control apparatus 100b according to the third embodiment also performs control processing and information collection processing by using input information as described above. FIG. 12 illustrates an example of a configuration relating to information collection processing in the control apparatus 100b according to the third embodiment by using functional blocks.

As illustrated in FIG. 12, the control apparatus 100b according to the third embodiment includes a storage unit 101b, an external I/F unit 103b, and a trigger determination unit 201b. The storage unit 101b includes a condition storage unit 25b having a function partially different from the storage units of the first and second embodiments described above. The external I/F unit 103b includes a user setting unit 18b. The trigger determination unit 201b includes a condition comparison unit 22b. Note that other constituent elements are the same as those in the first and second embodiments described above.

The condition storage unit 25b, which is a part of the storage unit 101b in the control apparatus 100b, is defined by an area of at least a part of the main storage unit 42 and/or the auxiliary storage unit 43. The condition storage unit 25b stores the above-described triggering condition and a feasibility flag indicating whether the condition comparison unit 22b to be described below can compare observation information with the triggering condition. Furthermore, the condition storage unit 25b stores flag update information in association with the triggering condition. The flag update information is for updating the feasibility flag stored in the condition storage unit 25b when the condition comparison unit 22b to be described below compares observation information with the triggering condition to thereby reveal that the observation information satisfies the triggering condition. The flag update information is information for changing the feasibility flag to "comparison feasible" or "comparison unfeasible". Note that the feasibility flag corresponds to an example of feasibility information indicating the feasibility of comparison between observation information and a triggering condition in the condition comparison unit, and the flag update information corresponds to an example of update information for changing the feasibility information.

Note that when a plurality of triggering conditions is stored, the condition storage unit 25b stores each piece of flag update information in association with a corresponding one of the triggering conditions. Moreover, in a case where a plurality of triggering conditions is stored in the condition storage unit 25b, a user can determine details of flag update information in accordance with the degree of importance of each triggering condition.

The condition comparison unit 22b, which is a part of the trigger determination unit 201b in the control apparatus 100b, is implemented by the processor 41. The condition comparison unit 22b has the function of making a determination regarding flag update information, in addition to the function set forth in the second embodiment described above. The condition comparison unit 22b makes a determination regarding flag update information, and updates the feasibility flag stored in the condition storage unit 25b.

The user setting unit 18b, which is a part of the external I/F unit 103b in the control apparatus 100b, is defined using the communication unit 45. In addition to the function set forth in the second embodiment described above, the user setting unit 18b has the function of outputting, to the condition storage unit 25b, flag update information corresponding to a triggering condition when outputting the triggering condition.

Figure 13:
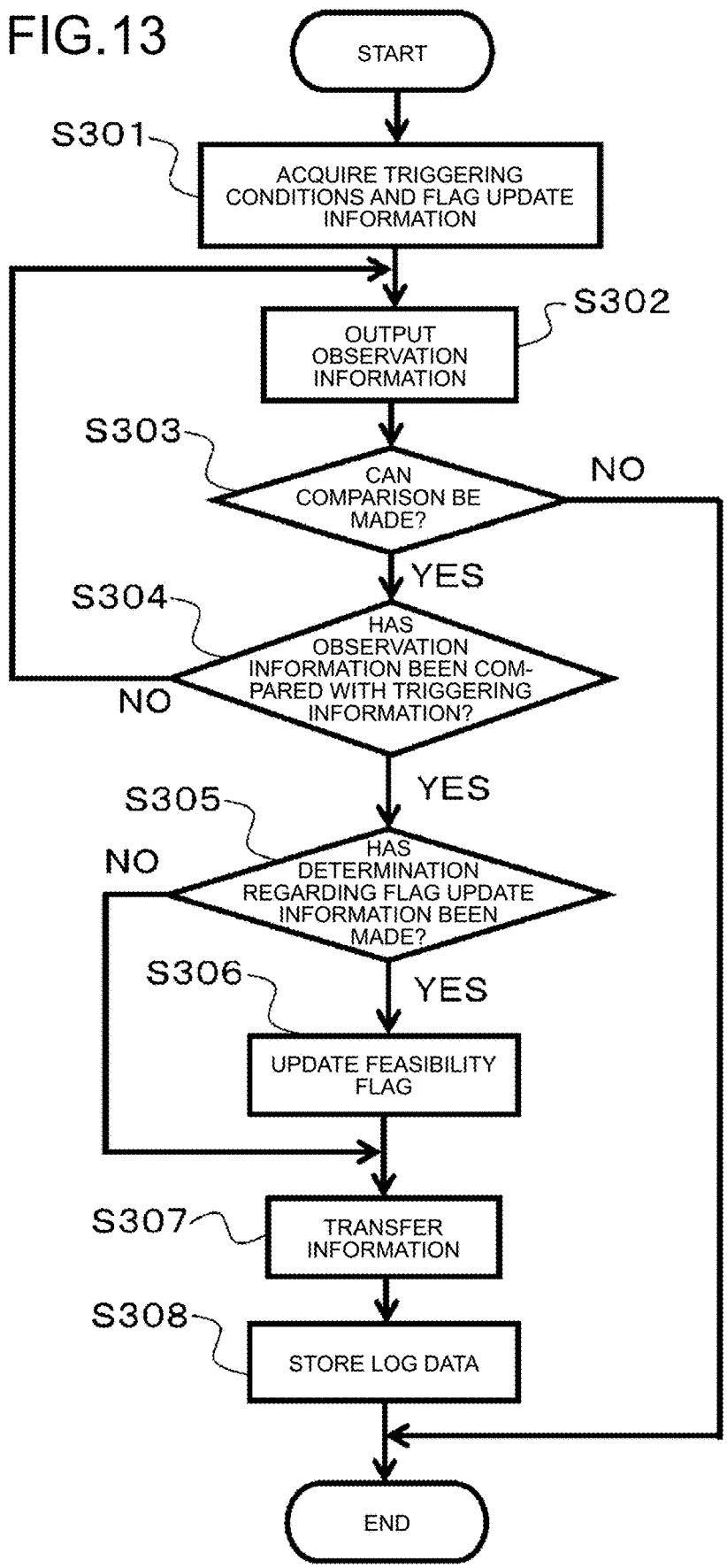
FIG. 13 is a flowchart illustrating the information collection processing to be performed by the control apparatus according to the third embodiment.

Operation and a control method related to information collection processing to be performed by the control apparatus 100b according to the third embodiment will be described below with reference to FIG. 13. FIG. 13 is an example of a flowchart illustrating the operation and the control method related to information collection processing to be performed by the control apparatus 100b. Note that, also in the third embodiment, information collection processing can be performed in parallel with control processing for controlling the device 30, as in the first and second embodiments described above.

The user inputs specification information, a triggering condition, flag update information, and a feasibility flag to the control apparatus 100b before the control apparatus 100b performs information collection processing. The specification information, the triggering condition, the flag update information, and the feasibility flag are stored in advance in the specification information storage unit 12 and the condition storage unit 25b via the user setting unit 18b. Note that the step of storing, in advance, the specification information, the triggering condition, the flag update information, and the feasibility flag described above in the specification information storage unit 12 and the condition storage unit 25b via the user setting unit 18b corresponds to an example of a condition storage step.

When starting information collection processing, the control apparatus 100b performs steps S101 to S106 set forth in the first embodiment. In addition, the control apparatus 100b implements operation related to the information collection processing by executing a control method set forth in steps S301 to S308 below.

The information collection processing set forth in steps S101 to S106 in FIG. 4 described above and the information collection processing set forth in steps S301 to S308 in FIG. 13 may be performed in parallel. Alternatively, steps S301 to S308 may be performed after steps S101 to S106 are performed. Note that, in FIG. 13, since steps S101 to S106 are identical to those in the first embodiment described above, illustration thereof is omitted, and steps S301 to S308 are illustrated and described.

As illustrated in FIG. 13, when the control apparatus 100b starts information collection processing, the condition comparison unit 22b acquires triggering conditions and flag update information corresponding to the triggering conditions, the triggering conditions and flag update information being stored in the condition storage unit 25b (step S301). Then, the system observation unit 21 observes the control state of the control apparatus 100b, and outputs observation information to the condition comparison unit 22b (step S302). When acquiring the observation information, the condition comparison unit 22b determines whether the observation information can be compared with the triggering conditions (step S303). When comparison between the observation information and the triggering conditions is feasible, the condition comparison unit 22b compares the observation information with the triggering conditions (step S304). When the observation information satisfies either of the triggering conditions, the condition comparison unit 22b makes a determination regarding flag update information corresponding to the triggering condition which the observation information satisfies (step S305). When the condition comparison unit 22b determines that the flag update information is information for changing the feasibility flag to "comparison unfeasible", the condition comparison unit 22b updates the feasibility flag stored in the condition storage unit 25b to thereby changes that flag to "comparison unfeasible" (step S306). Note that when the condition comparison unit 22b determines that the flag update information is information for changing the feasibility flag to "comparison feasible", step S306 is skipped. Then, the condition comparison unit 22b notifies the log data transfer unit 24 that the observation information satisfies the triggering condition. Upon receiving the notification, the log data transfer unit 24 acquires state information from the state storage unit 14, and transfers the acquired state information to the log data storage unit 23 (step S307). The log data storage unit 23 stores log data, i.e., the state information acquired from the log data transfer unit 24 (step S308). Each step will be described below.

In step S301, the condition comparison unit 22b acquires, from the condition storage unit 25b, triggering conditions and pieces of flag update information corresponding to the triggering conditions. FIG. 14 schematically illustrates examples of a feasibility flag, triggering conditions, and flag update information stored in the condition storage unit 25b.

As illustrated in FIG. 14, the condition storage unit 25b stores triggering conditions, i.e., a condition 1 and a condition 2, and stores flag update information associated with each of the condition 1 and the condition 2. In FIG. 14, a symbol "x" indicating information for changing the feasibility flag to "comparison unfeasible" is stored as flag update information corresponding to the condition 1, and a symbol "∘" indicating information for changing the feasibility flag to "comparison feasible" is stored as flag update information corresponding to the condition 2. Furthermore, FIG. 14 shows that a flag "∘" is stored as a feasibility flag indicating that "comparison is feasible". Note that the third embodiment is described assuming that the condition comparison unit 22b acquires the condition 1 and the condition 2 as triggering conditions, and also acquires flag update information. Note that in FIG. 14, the flag "comparison feasible" is indicated by the symbol "∘", and the flag "comparison unfeasible" is indicated by the symbol "x". However, the flags "comparison feasible" and "comparison unfeasible" need not be indicated by the symbols "∘" and "x", and may be indicated by other symbols or textual information.

In step S302, the system observation unit 21 observes the control state of the control apparatus 100b, and outputs observation information to the condition comparison unit 22b. Since processing to be performed in step S302 is the same as that in step S202 of the second embodiment described above, a description thereof will be omitted. Note that step S302 corresponds to an example of the system observation step.

In step S303, when acquiring the observation information, the condition comparison unit 22b reads a feasibility flag from the condition storage unit 25b, and checks the feasibility flag to determine whether the observation information can be compared with the triggering conditions. In a case where the feasibility flag is "∘ (comparison feasible)" in step S303 (step S303: YES), the control apparatus 100b proceeds to step S304. In a case where the feasibility flag is "x (comparison unfeasible)" in step S303 (step S303; NO), the control apparatus 100b performs, in the control apparatus 100b, steps S101 to S106 set forth in the first embodiment described above, and ends the process without performing steps S304 to S308.

In step S304, when the feasibility flag regarding comparison between the observation information and the triggering conditions is "∘ (comparison feasible)" in step S303, the condition comparison unit 22b compares the observation information with the triggering conditions. In the third embodiment, the condition comparison unit 22b acquires triggering conditions, i.e., the condition 1 and the condition 2 illustrated in FIG. 14. Note that a condition freely determined by the user can be employed as a triggering condition, as described in the second embodiment above.

In the third embodiment, the condition comparison unit 22b compares a single piece of observation information with each of the condition 1 and the condition 2 that are triggering conditions in step S304. In a case where comparison made by the condition comparison unit 22b between the observation information and the triggering conditions indicates that the observation information satisfies at least one of the condition 1 and the condition 2 (YES in step S304), step S305 to be described below is performed. In addition, in a case where the observation information satisfies neither the condition 1 nor the condition 2 (No in step S304), the condition comparison unit 22b returns to step S302, and repeats the processing.

When the observation information satisfies either of the triggering conditions in step S304, the condition comparison unit 22b makes a determination regarding flag update information corresponding to the triggering condition which the observation information satisfies, in step S305. That is, when the observation information satisfies the condition 1, the condition comparison unit 22b checks flag update information corresponding to the triggering condition 1, and determines whether the flag update information is information for changing the feasibility flag to "∘ (comparison feasible)" or "x (comparison unfeasible)". Furthermore, when the observation information satisfies the condition 2, the condition comparison unit 22b makes a determination regarding flag update information corresponding to the triggering condition 2 in the same manner as described above.

When the condition storage unit 22b determines in step S305 that the flag update information is information for changing the feasibility flag to "x (comparison unfeasible)" (case represented as step S305: YES), the condition storage unit 22b updates the feasibility flag stored in the condition storage unit 25b to provide "x (comparison unfeasible)" in step S306. That is, in the third embodiment, the flag update information corresponding to the triggering condition 1 is information for changing the feasibility flag to "x (comparison unfeasible)", and the flag update information corresponding to the condition 2 is information for changing the feasibility flag to "∘ (comparison feasible)", as illustrated in FIG. 14. When making a determination regarding the flag update information corresponding to the condition 1 in step S305, therefore, the condition storage unit 22b updates the feasibility flag stored in the condition storage unit 25b to provide "x (comparison unfeasible)". Then, after updating the feasibility flag, the condition storage unit 22*b* notifies the log data transfer unit 24 that the observation information satisfies the triggering condition. The condition comparison unit 22*b* outputs the observation information that satisfies the triggering condition in step S304, together with the notification. Note that when making a determination regarding the flag update information corresponding to the condition 2 in step S305, the condition storage unit 22*b* skips the present step, that is, step S306 (NO in step S305). When step S306 is skipped, the condition comparison unit 22*b* notifies the log data transfer unit 24 that the observation information satisfies the triggering condition, after performing step S305, and outputs the observation information satisfying the triggering condition in step S304, together with the notification. Note that steps S303 to S306 described above correspond to an example of the condition comparison step.

In step S307, upon receiving the notification from the condition comparison unit 22*b*, the log data transfer unit 24 acquires, from the state storage unit 14, all the state information stored in the state storage unit 14 at the time of receiving the notification. Then, the log data transfer unit 24 transfers, to the log data storage unit 23, the state information acquired from the state storage unit 14 and the observation information acquired from the condition comparison unit 22*b*.

In step S308, the log data storage unit 23 stores, log data, i.e., the state information and the observation information transferred from the log data transfer unit 24 in association with each other. Note that in the third embodiment, since log data to be stored are configured in a manner similar to the log data set forth in the second embodiment described above, a description thereof will be omitted. Note that step S308 corresponds to an example of the log data storage step.

As described above, the control apparatus 100*b* and the control method according to the third embodiment can achieve the same effects as those of the first and second embodiments described above.

Furthermore, in the control apparatus 100*b* and the control method according to the third embodiment, the condition storage unit 25*b* stores a feasibility flag and flag update information. The feasibility flag indicates the feasibility of comparison between observation information and a triggering condition. The flag update information is for updating the feasibility flag stored in the condition storage unit 25*b* when the observation information satisfies the triggering condition. When the observation information satisfies the triggering condition, the condition comparison unit 22*b* makes a determination regarding flag update information corresponding to the triggering condition which the observation information satisfies. When the condition comparison unit 22*b* determines that the flag update information is information for changing the feasibility flag to "x (comparison unfeasible)", the condition comparison unit 22*b* updates the feasibility flag stored in the condition storage unit 25*b* to provide "x (comparison unfeasible)". That is, when the observation information satisfies the triggering condition, the condition comparison unit 22*b* can store log data, and stop comparison between the subsequent observation information and the triggering condition. When a predetermined triggering condition specified by the user is satisfied, therefore, the condition comparison unit 22*b* can store log data and prevent the stored log data from being overwritten and lost.

The configurations set forth in the above embodiments show examples of the subject matter of the present disclosure, and it is possible to combine the configurations with another known technique, and is also possible to partially omit or change the configurations without departing from the scope of the present disclosure.

The first embodiment has been described giving an example in which type information indicating a request type included in input information is "write". Alternatively, the control apparatus of the present disclosure can also perform information collection processing on input information including other type information in a similar manner. For example, information indicating the request type "read" referring to a read request is stored as specification information in association with information on a specification memory address specified in such a way as to correspond to the request type. This enables information collection processing to be performed when type information included in input information indicates the request type "read" referring to a request to read device data stored in a predetermined memory address.

In addition, the first embodiment described above provides, by way of example, the three storage areas specified as specification information. However, the number of storage areas to be specified in specification information may be one or two. Alternatively, four or more storage areas may be specified in specification information.

In the first to third embodiments described above, the state storage unit 14 stores state information via the data extraction unit 15 and the data transfer unit 16. However, in the control apparatus of the present disclosure, the state storage unit 14 may store state information through another configuration. For example, the data collection unit 102 may be configured such that the type identification unit 13 identifies a request type, and also implements the functions of the data extraction unit 15 and the data transfer unit 16 as well. In addition, other functional blocks that implement the functions of the data extraction unit 15 and the data transfer unit 16 may be provided.

In the second and third embodiments described above, the log data storage unit 23 stores log data via the log data transfer unit 24. However, in the control apparatus of the present disclosure, the log data storage unit 23 may store log data through another configuration. For example, the condition comparison units 22 and 22*b* may be configured to compare observation information with a triggering condition and implement the function of the log data transfer unit 24. Furthermore, the log data storage unit 23 may include a storage medium detachable from the control apparatus.

In the second and third embodiments described above, the condition comparison units 22 and 22*b* compare the observation information with the triggering condition and output the observation information satisfying the triggering condition, together with notification that the observation information satisfies the triggering condition. However, the condition comparison units 22 and 22*b* are not necessarily required to output the observation information satisfying the triggering condition, provided that condition comparison units 22 and 22*b* provide notification that the observation information satisfies the triggering condition.

REFERENCE SIGNS LIST 1000 control system; 100, 100*a*, 100*b* control apparatus; 101, 101*a*, 101*b* storage unit; 102 data collection unit; 103, 103*a*, 103*b* external I/F unit; 201, 201*b* trigger determination unit; 202 log data storing unit; 11 device data storage unit; 12 specification information storage unit; 13 type identification unit; 14 state storage unit; 15 data extraction unit; 16 data transfer unit; 17 communication processing unit; 18, 18b user setting unit; 21 system observation unit; 22, 22b condition comparison unit; 23 log data storage unit; 24 log data transfer unit; 25, 25b condition storage unit; 30 device; 41 processor; 42 main storage unit; 43 auxiliary storage unit; 44 ROM; 45 communication unit; 46 internal bus; 50 terminal.

The invention claimed is:

1. A control apparatus for controlling a device to be controlled, using input information input from an outside, the apparatus comprising:
a processor to execute a program; and
a memory to store the program that, when executed by the processor, performs a type identification process of identifying a request type representing a type of request included in the input information, wherein
the memory includes:
a device data memory to store, in storage areas, device data to be written or read in accordance with the input information and used for the control;
a specification information memory to store specification information that associates the request type with information that specifies any of the storage areas; and
a state memory to store state information when the request type identified by the type identification process is a preset request, the state information including device information and the input information in association with each other, the device information including the device data stored in the storage area specified in the specification information.

2. The control apparatus according to claim 1, wherein
the storage area of the device data memory is assigned a memory address specifying the storage area, and
the state memory stores the state information including the memory address specifying the storage area that stores the device data included in the device information.

3. The control apparatus according to claim 1, wherein when executed by the processor, the program further performs
a data extraction process of extracting the specification information on a basis of the request type identified by the type identification process, and create the device information corresponding to the extracted specification information.

4. The control apparatus according to claim 1, wherein when executed by the processor, the program further performs:
a system observation process of observing a control state of the control apparatus, and outputting observation information indicating the control state; and
a condition comparison process of comparing the observation information with a preset triggering condition and, wherein the memory further includes
a log data memory to store log data, the log data being the state information, when the comparison made by the condition comparison unit reveals that the observation information satisfies the triggering condition, the state information being stored in the state memory.

5. The control apparatus according to claim 4, wherein the comparison made by the condition comparison process reveals that the observation information satisfies the triggering condition, and the log data memory stores the log data, the log data being the state information and the observation information satisfying the triggering condition, the state information and the observation information being associated with each other.

6. The control apparatus according to claim 4, wherein the memory further includes:
a condition memory to store the triggering condition, feasibility information, and update information, the feasibility information indicating feasibility of the comparison in the condition comparison process, the update information being associated with the triggering condition and used for changing the feasibility information, wherein
the condition comparison process makes the comparison on the basis of the feasibility information, and changes the feasibility information on the basis of the update information associated with the triggering condition satisfied by the observation information when the comparison reveals that the observation information satisfies the triggering condition.

7. The control apparatus according to claim 6, wherein the condition comparison process makes a determination regarding the update information associated with the triggering condition satisfied by the observation information, when the comparison reveals that the observation information satisfies the triggering condition, and changes the feasibility information in such a way as to indicate that comparison is unfeasible, when the update information regarding which the condition comparison process has made is information for changing the feasibility information in such a way as to indicate that comparison is unfeasible.

8. A control method to be executed by a control apparatus for controlling a device to be controlled, using input information input from an outside, the method comprising:
identifying a request type representing a type of request included in the input information;
storing specification information that specifies any of storage areas that store device data to be used for the control; and
storing state information when the identified request type is a preset request, the state information including device information and the input information in association with each other, the device information including the device data stored in the storage area specified in the specification information.

9. The control method according to claim 8, comprising:
observing a control state of the control apparatus, and outputting observation information indicating the control state;
comparing the observation information with a preset triggering condition; and
storing log data, the log data being the stored state information, when the comparison reveals that the observation information satisfies the triggering condition.

10. The control method according to claim 9, comprising:
storing the triggering condition, feasibility information, and update information, the feasibility information indicating feasibility of the comparison, the update information being associated with the triggering condition and used for changing the feasibility information, wherein
the comparison includes making the comparison on a basis of the feasibility information, and changing the feasibility information on the basis of the update information associated with the triggering condition satisfied by the observation information when the comparison reveals that the observation information satisfies the triggering condition.

11. The control method according to claim 10, wherein the comparison includes making a determination regarding the update information associated with the triggering condition satisfied by the observation information, when the comparison reveals that the observation information satisfies the triggering condition, and changing the feasibility information in such a way as to indicate that comparison is unfeasible, when the update information regarding which the determination has been made is information for changing the feasibility information in such a way as to indicate that comparison is unfeasible.

* * * * *